United States Patent
Suedekum

(10) Patent No.: US 7,511,503 B2
(45) Date of Patent: Mar. 31, 2009

(54) MULTIPLE ELECTRODE METHOD AND DEVICE FOR GEOELECTRICAL MAPPING OF NEAR SURFACE LAYERS

(75) Inventor: Wolfgang Suedekum, Isernahgen (DE)

(73) Assignee: Institut fuer Geowissenschaftliche Gemeinschaftsaufgaben, Hannover (DE)

( * ) Notice: Subject to any disclaimer, the term of this patent is extended or adjusted under 35 U.S.C. 154(b) by 0 days.

(21) Appl. No.: 11/490,321

(22) Filed: Jul. 20, 2006

(65) Prior Publication Data

US 2007/0069733 A1    Mar. 29, 2007

(30) Foreign Application Priority Data

Aug. 13, 2005  (DE)  ........................ 10 2005 038 481

(51) Int. Cl.
  *G01V 3/08*  (2006.01)
(52) U.S. Cl. ........................ 324/354; 324/345; 324/350; 324/348
(58) Field of Classification Search ......... 324/345–366; 702/5

See application file for complete search history.

(56) References Cited

U.S. PATENT DOCUMENTS 2,105,247 A * 1/1938 Jakosky ...................... 324/363
5,587,659 A * 12/1996 S.o slashed.rensen ....... 324/357

* cited by examiner

*Primary Examiner*—Reena Aurora
(74) *Attorney, Agent, or Firm*—Jordan and Hamburg LLP

(57) ABSTRACT

The invention a method and device for carrying out geoelectric mappings. The device includes electrodes, a power supply and a voltage measuring device, for carrying out the method. The electrodes are disposed apart from one another on ground to be investigated and electric current is supplied by certain electrodes to the ground and electric potential is measured by remaining electrodes using the voltage measuring device. The device and method carry out a continuous, geoelectric mapping, with which accurate measurements are achieved. The device is embodied such that the electrodes are disposed at a outside of an endless loop and that this endless loop revolves continuously at the same rate at which the device is moving over the ground to be investigated during the mapping, so that at least two supplying and two potential electrodes rest on the ground investigated during each individual measurement.

13 Claims, 1 Drawing Sheet

MULTIPLE ELECTRODE METHOD AND DEVICE FOR GEOELECTRICAL MAPPING OF NEAR SURFACE LAYERS

The invention relates to a method for carrying out geoelectric mappings and to a corresponding device, including of electrodes, a power supply and a voltage measuring device, for carrying out the method, the electrodes being disposed at a defined distance from one another on the ground that is to be investigated and electric current being supplied by certain (supplying) electrodes to the ground to be investigated and the electric potential being measured by the remaining (potential) electrodes by means of the measuring device.

Geological underground structures are detected with the help of highly resolving geoelectrical methods. These methods are based on the different conductivities of various rock layers with respect to the surroundings, because different rocks have a different specific resistance, depending on their chemical composition and their formation. For this method of investigation, a voltage drop between two electrodes in an artificially produced electrical field, which depends on the resistance of the rock layers, is measured. If the distance between the supplying electrodes is enlarged, deeper penetrations into the ground to be investigated are attained and included in a measuring range. If layers of deviating conductivities are penetrated, the voltage drop, which is measured in the surface of the ground, changes and permits conclusions to be drawn concerning underground structures. The possibilities for use in flat-ground areas of investigation, such as in agriculture, soil science and restoration of environmental damage, have gained appreciably in importance in recent years.

Geoelectric mapping by way of an electrode chain, which is to be positioned stably on the ground that is to be investigated, is known. The electrodes for supplying current and measuring the electric potential are knocked into the ground at defined intervals, such as 1 m, 2 m or 5 m. The work involved for this purpose is considerable, since the electrodes must be inserted or knocked into the ground by hand. Much time is expended in mapping a region, since the electrode chains must be repositioned in a fixed grid within the mapping area and the measurements must be carried out once again discontinuously after the electrode chain has been repositioned.

In order to decrease this high effort required in terms or personnel and time, devices, which can be used for mappings near the surface and up to a depth of 2 m and with which continuous, progressive measurements can be carried out, have become known. These devices consist of electrode wheels, which are connected with one another by means of a horizontally disposed connecting frame and are moved during the measurement over the ground that is to be investigated by rotating the electrode wheels However, these devices lead to particularly unfavorable measuring conditions, because the junction resistance at a moving or rotating electrode changes constantly. As a result, the current, supplied to the ground by way of the electrodes, also changes constantly and produces a varying exciter field. This leads to particularly difficult measurement conditions at the potential electrodes and, with that, to inaccurate measurement results.

SUMMARY OF THE INVENTION

The present invention avoids the disadvantages of the prior art. It is an object of the present invention to make a method and a device available, in order to be able to carry out a continuous, geoelectric mapping, which requires little expenditure in terms of personnel or time and with which accurate measurements can be achieved.

An embodiment of a device of the present invention provides an apparatus wherein electrodes are disposed at an outside of an endless loop and the endless loop revolves continuously at a same rate at which device advancing the endless loop moves over ground to be investigated during mapping, so that at least two supplying and two potential electrodes rest on the ground to be investigated during each individual measurement.

An embodiment of a method of the present invention is carried out in such a manner that electrodes are disposed at an outside of an endless loop and that this endless loop is allowed to revolve continuously at a speed at which the device is moved over ground to be investigated during mapping, so that supplying and potential electrodes rest on the ground to be investigated during each individual measurement.

The present invention is based on the realization that an accurate measurement result can be obtained only with the electrodes at rest. In the case of a measuring system which is moving continuously, the supplying and potential electrodes rest on the ground to be investigated when the revolving speed of the endless loop holding the electrodes is equal to the speed Of the traveling measuring system.

The present invention includes features wherein an endless loop is an endless belt, which is passed over guide rollers, or a chain, which consists of many links. In order to be able to carry out measurements pursuant to the present invention, the guide rollers must be disposed in such a manner, that a bottom strand is aligned approximately horizontally and the electrodes, disposed at its outside, rest on or penetrate slightly into the surface of the ground investigated. Preferably, the endless loop is made from a non-conducting material or the electrodes are disposed electrically insulated on the endless belt.

It is particularly advantageous if the endless loop is a track of a caterpillar track vehicle and if the electrodes, insulated electrically from the chain, are disposed at and/or between links of the chain. The vehicle may be motor-driven. It may, however, also be configured in the form of a trailer. If configured in the form of a caterpillar track vehicle, the vehicle rests on the track, which, at the same time, contains the electrode arrangements necessary for the measurements. The revolving speed of the caterpillar track and the forward speed of the vehicle are identical, so that the electrodes, resting on the ground, are at rest during the measurement.

In an embodiment of the present invention a conventional, commercial vehicle is equipped with the measuring system described above, if the endless loop is guided over two guide rollers, which are disposed on an imaginary straight line, so that the endless loop consists of an approximately horizontal upper and lower strand and that the endless loop is disposed at a vehicle with such means, that, for measurements, these means can be lowered onto the ground that is to be investigated. It may be appropriate here to equip the endless loop with additional supports. This arrangement has the advantage that the vehicle can be used in normal traffic if, for example, the measuring system is disposed at an off-road vehicle, the vehicle can be driven at the usual speed to the mapping area. For use in measuring, the measuring device can be lowered to the ground. At the end of its use for measuring, the measuring device is raised, so that the electrodes no longer touch the ground and the vehicle can change location at the usual speed.

It is advantageous if contacts, preferably in the form of elastically suspended contact bars, are provided over the lower strand of the endless loop for the current-carrying contacts and if contacts, pressed against the contact bars, are disposed at the current-supplying electrodes or if roll contacts for supplying current and for transferring the potential to be measured, are disposed above the lower strand.

In order to be able to have different electrode arrangements at one and the same device, it is advantageous if the endless loop is provided at its outside with a plurality of electrode holders, which are disposed at regular intervals behind and next to one another Electrodes may be disposed reversibly in these electrode holders, in which appropriate means for supplying current and for transferring the measurement potential are present.

For transferring measurement data, it is appropriate to provide means for transferring measurement data by means of contact bars or by means of contactless transducers at the potential electrodes.

The electrodes, disposed at the outside of the endless loop, may be constructed, in particular, as lances or as cones, so that, while used for measurement, they rest as points on the ground to be investigated. However, the electrodes may also be constructed in such a way, that they rest two-dimensionally on the ground investigated and generate a homogeneous field.

In the event that the electrodes are constructed as lances, it is appropriate if the electrode lances are mounted elastically and perpendicularly through the endless belt in such a manner that they are shifted by the contact maker, disposed above the lower strand, against the force of a spring for measuring in the direction of the ground investigated, whereas a tip of the electrode, during a remaining revolution of the endless loop, is held by the force of a spring within the endless loop. For this purpose, it may be necessary to provide the guide rollers with appropriate recesses, which permit the belt to revolve with the lances retracted.

A so-called square arrangement of the electrodes is preferred for certain measurements. For this purpose, it is advantageous in the electrodes are disposed at defined intervals behind or next to one another on the outside of a broad, endless loop or if two endless loops, carrying the electrodes, are disposed parallel to one another.

Electrodes, which preferably have a square arrangement, may be disposed at both caterpillar tracks of a caterpillar track vehicle.

Several endless loops may be disposed as belts or tracks behind one another and/or next to one another, depending on the requirements, which are to be met by the measuring field that is to be generated.

The essence of the invention is explained in greater detail in the following by means of an example, which is shown diagrammatically in the drawing.

DETAILED DESCRIPTION

Figure 1:
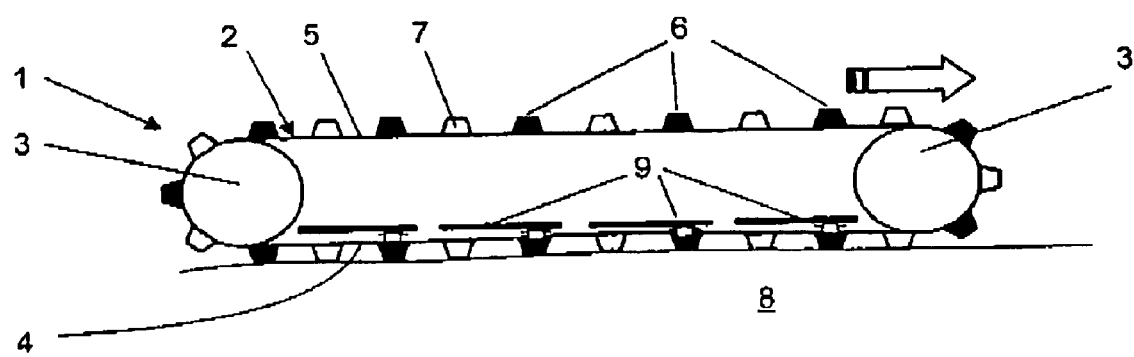
FIG. 1 is a drawing which shows in a simplified fashion a device for geoelectrical mapping.

Referring to FIG. 1, a device of the present invention includes a track 2 in the form of a caterpillar track, which is formed from a plurality of track links. The caterpillar track 2 is guided at guide rollers 3 in such a way, that it has an approximately horizontal lower strand 4 and upper strand 5. Electrodes 6 are disposed at defined intervals on an outside of the caterpillar tracks, which are not conductive electrically. Track links 7 are between the electrodes 6. The outside of the lower stand 4 rests on ground 8 to be surveyed.

During continuous geoelectrical mapping, the device is moved in the direction of the arrow over the ground 8 which is to be mapped, and measurements being carried out at the same time. By way of two electrodes 6 of the lower strand 4, resting on the ground 8, current is supplied over sliding contacts 9 to the ground, which is to be investigated. Electric potentials are measured over two further electrodes 6, the sliding contacts 9 also serving to transfer the potential.

Although the device is advanced continuously over the ground profile that is to be mapped, the supplying and potential electrodes rest on the ground, which is to be investigated, during the individual measurement, so that accurate measurement results can be achieved in spite of the continuous method of measuring.

What is claimed is:

1. A device for carrying out geoelectric mapping of a ground area, comprising:

electrodes including supply electrodes and potential measurement electrodes, a power supply supplying power to said supply electrodes during a measurement period, a voltage measuring device connected to said potential measurement electrodes for measuring potentials therebetween, an endless loop continuously rotated about first and second axes displaced apart such that a portion of the endless loop between said first and second axes lies in contact with and conforming to said ground area between a beginning point of contact and an ending point of contact for a period of time during which the portion of the endless loop is stationary with respect to said ground area; and the electrodes being disposed at an outside surface of the endless loop which revolves and is moved continuously during the geoelectric mapping over the ground area to be investigated in such a manner that the supplying electrodes and the potential measurement electrodes are at rest on the ground along with said portion of the endless loop so that the ground area to be investigated during each individual measurement is stationary with respect to said supply electrodes and said potential measurement electrodes during said measurement and while said endless loop is continuously rotated.

2. The device of claim 1, wherein the endless loop is a track of a caterpillar track vehicle and the supply electrodes and said potential measurement electrodes are disposed, electrically insulated, at and/or between track links of the track.

3. The device of claim 2, wherein the supply electrodes and said potential measurement electrodes form a square arrangement and are disposed at both tracks of a caterpillar track vehicle.

4. The device of claim 1, wherein:

the endless loop is guided over two guide rollers respectively rotated about said first and second axes, the guide rollers being disposed on a virtual horizontal straight line, and the endless loop has a horizontally aligned upper and lower strands and the endless loop is disposed in such a manner at a vehicle that, for use in measurements, the endless loop is lowerable to the ground investigated.

5. The device of claim 4, wherein contacts, in the form of elastically suspended contact bars, are provided over the lower strand of the endless loop for supplying current and that contacts, pressed against the contact bars, are disposed at the supplying electrodes and that contacts, pressed against the contact bars, are disposed at the potential measurement electrodes.

6. The device of claim 5, wherein rolling contacts for supplying current and for transmitting the potential, which is to be measured, are disposed above the lower strand.

7. The device of claim 4, wherein means for transferring measurement data by means of contact bars or by means of contactless transducers are provided at the potential measurement electrodes.

8. The device of claim 1, wherein the supply electrodes and said potential measurement electrodes are constructed as lances or as cones and rest on the ground investigated at points.

9. The device of claim 8, wherein the electrode lances are mounted elastically through the endless loop in such a manner so a to be shifted by the contact bars, disposed above the lower strand against a force of a spring in a direction of the ground investigated, while a tip of the electrode lances, during a remaining revolution portion, is held within the endless loop by the force of the spring.

10. The device of claim 1, wherein the supply electrodes and said potential measurement electrodes are constructed in such a manner as to rest two-dimensionally on the ground investigated.

11. The device of claim 1, wherein the supply electrodes and said potential measurement electrodes are mounted behind and next to one another and at a distance from one another in a square arrangement at a wide endless belt.

12. The device of claim 1 wherein several endless loops are disposed behind and/or next to one another.

13. A method for carrying out geoelectric mapping of a ground area, comprising:
- disposing supplying and potential electrodes on an outside surface of an endless loop,
- revolving the endless loop over the ground to be investigated and about at least first and second axes of rotation such that a portion of the endless loop lays between a beginning point of contact and an ending point of contact lies in contact with the ground area and at rest with respect to the ground over a length of the endless loop conforming to the ground area,
- continuously geoelectrically mapping by supplying current with the supplying electrodes and measuring a potential with the potential electrodes in such a manner that the supplying electrodes and the potential electrodes are at rest on the ground investigated during each individual measurement while the endless loop is revolving.

* * * * *